United States Patent
Razzell et al.

(10) Patent No.: US 8,269,522 B2
(45) Date of Patent: Sep. 18, 2012

(54) ACTIVE EYE OPENER FOR CURRENT-SOURCE DRIVEN, HIGH-SPEED SERIAL LINKS

(75) Inventors: Charles Razzell, Pleasanton, CA (US); Hong Sair Lim, Singapore (SG); Batuhan Okur, Singapore (SG); Jerome Tjia, Singapore (SG); Tue Fatt David Wee, Singapore (SG)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 12/966,480

(22) Filed: Dec. 13, 2010

(65) Prior Publication Data

US 2011/0221521 A1   Sep. 15, 2011

Related U.S. Application Data

(60) Provisional application No. 61/286,147, filed on Dec. 14, 2009.

(51) Int. Cl.
*H03K 17/16* (2006.01)
*H03K 19/003* (2006.01)

(52) U.S. Cl. ........... 326/26; 326/83; 326/86; 327/108

(58) Field of Classification Search ........... 326/21–34, 326/82–87; 327/108–112
See application file for complete search history.

(56) References Cited

U.S. PATENT DOCUMENTS

| | | | |
|---|---|---|---|
| 5,535,241 A | 7/1996 | Mahant-Shetti et al. | |
| 6,212,224 B1 | 4/2001 | Cammarota et al. | |
| 6,590,432 B1 * | 7/2003 | Wu et al. | 327/108 |
| 6,842,058 B2 | 1/2005 | McNitt et al. | |
| 6,940,302 B1 | 9/2005 | Shumarayev et al. | |
| 7,394,281 B1 | 7/2008 | Bandholz et al. | |
| 7,504,889 B2 | 3/2009 | Miao et al. | |
| 7,965,100 B1 * | 6/2011 | Considine et al. | 326/30 |
| 2006/0220685 A1 * | 10/2006 | Jordy | 326/83 |
| 2008/0301347 A1 | 12/2008 | Bandholz et al. | |
| 2009/0033365 A1 | 2/2009 | Miura | |

OTHER PUBLICATIONS

C. H. Lin, C. H. Wang and S. J. Jou, "5Gbps Serial Link Transmitter with Pre-emphasis," IEEE Asia and South Pacific Design Automation Conference, Jan. 2003, pp. 795-800.

* cited by examiner

*Primary Examiner* — Shawki S Ismail
*Assistant Examiner* — Jany Tran
(74) *Attorney, Agent, or Firm* — Coats & Bennett, P.L.L.C.

(57) ABSTRACT

A current boost circuit acts as an "eye opener" for a digital bus line. A controlled current injects a fraction of the normal signaling current magnitude from a source driver onto the bus line, after a transition between the two logical states on the bus line is detected. The duration of the additional current injection is a fraction of the unit interval. In one embodiment, a linear system uses the summation of a proportional boost current and a delayed and negated proportional boost current. In another embodiment, a positive or negative edge detection circuit triggers a monostable pulse generator that controls the injection of short bursts of additional current into the bus lines. In some embodiments the boost current is suppressed when the bus line is driven from a driver other than the source driver.

18 Claims, 11 Drawing Sheets

ACTIVE EYE OPENER FOR CURRENT-SOURCE DRIVEN, HIGH-SPEED SERIAL LINKS

This application claims priority to U.S. provisional patent application Ser. No. 61/286,147, filed 14 Dec. 2009, titled, "Active Eye Opener for Current-Source Drive, High-Speed Serial Links, Including USB2.0," the disclosure of which is incorporated herein by reference in its entirety.

FIELD OF INVENTION

The present invention relates generally to high-speed serial bus links, and in particular to a boost current circuit operative to improve eye diagram performance of a serial bus link.

BACKGROUND

Digital systems communicate data both internally (e.g., between a processor and memory) and externally (e.g., between devices, such as a host computer and a mobile wireless communication device) on "buses." Parallel buses are characterized by a separate data line for each bit in a data unit, such as a byte or word. In contrast, a serial bus comprises a single logical data line, with bit values being transmitted successively. A bus line—whether a serial bus or a single bit of parallel bus—may be implemented as a single-ended line, wherein a voltage or current varies with respect to a reference, or ground, value. Alternatively, to improve reliability at high data rates and/or in an electrically noisy environment, a bus line may be implemented as a differential pair, wherein the voltage or current on separate conductors are controlled in opposite directions, and a datum value is represented as the relative value between the two. Buses may be bidirectional, with two (or more) controllers operative to drive data values onto the bus.

The Universal Serial Bus (USB) is a bidirectional serial bus specification designed to establish communication between devices and a host controller. Originally designed for personal computers, the USB is intended to replace many varieties of serial and parallel ports. For example, USB connects many computer peripherals such as mice, keyboards, digital cameras, printers, personal media players, flash drives, external hard drives, and the like. Although designed for personal computers, USB has found application in a broad variety of other data communication contexts. USB signals are transmitted on a braided pair data cable with 90Ω±15% Characteristic impedance, labeled D+ and D−. Prior to USB 3.0, these collectively use half-duplex differential signaling to reduce the effects of electromagnetic noise on longer lines. Transmitted signal levels are 0.0-0.3 volts for low and 2.8-3.6 volts for high in full speed mode (12 Mbits/s) and low speed mode (1.5 Mbits/s), and −10-10 mV for low and 360-440 mV for high in hi-speed mode (480 Mbits/s). In full speed mode the cable wires are not terminated, but the hi-speed mode has termination of 45Ω to ground, or 90Ω differential to match the data cable impedance, reducing interference of particular kinds.

USB devices are tested for compliance with the USB technical specifications. One tool used in the testing is an eye diagram. The diagram measures a data signal's rise time, fall time, undershoot, overshoot, and jitter. With a USB 2.0 eye diagram, the test system performs the measurements over one USB data packet (488 bits). After receiving test data from an oscilloscope, testing scripts take the data from each bit period (2.0833 ns) and overlay all bits onto a USB 2.0 eye mask.

Because the USB is bidirectional, many systems implementing active switching of drivers on the D+ and D− lines, for example by means of CMOS switches, to prevent collisions when another entity drives data on the bus. This inevitably adds series resistance to the source impedance used to drive the lines, which often have a high capacitance. For example, a realistically sized CMOS switch may add 5-10Ω—a significant increase considering the specified termination to ground is 45Ω. This may reduce signal transition slew rates (i.e., rise and fall times), resulting in noncompliance of the eye diagram test at the near and/or far end of the link.

Accordingly, a need exists in the art for a strategy that will overcome the slow and/or reduced amplitude transitions caused parasitic RC integration time constants. Additionally, some equalization for the limited frequency response of the USB cable would be beneficial. Because the DC conductivity of the wire connections between both ends of the link must be preserved, conventional high-pass filter sections cannot simply be inserted into the bus line. Directional, active filters will also cause a significant problem since either end of the link can become the master and begin sourcing current into the serial connection wires. Most conventional equalizer topologies will cause a disturbance to the desired characteristic impedance of the serial line (i.e., 45Ω to ground or 90Ω differential). Thus, a solution to the deleterious effects of parasitic RC integration time constants, that does not significantly alter termination impedances, is desired.

SUMMARY

According to embodiments disclosed and claimed herein, a current boost circuit acts as an "eye opener" for a digital bus line. A controlled current injects a fraction of the normal signaling current magnitude onto the bus line, as soon as possible after a transition between the two logical states on the bus line is detected. The duration of the additional current injection is a fraction of the unit interval. In one embodiment, a fully linear system uses the summation of a proportional boost current and a delayed and negated proportional boost current. In another embodiment, a positive or negative edge detection circuit triggers monostable pulse generators that control the injection of short bursts of additional current into the bus lines. In some embodiments the boost current is suppressed when the bus line is driven from a driver other than the source driver being boosted.

One embodiment relates to a current boost circuit to augment a signal on a digital bus line that is primarily driven by a current-mode source driver operative to transmit a signal on the bus line by driving a predetermined current onto the bus line for a unit interval of a predetermined duration. The current boost circuit includes a trigger circuit operative to detect a signal transition on the bus line. The current boost circuit also includes a current generator operative to drive boost current on the bus line in the same direction as the source driver, for a duration that is a sub-unity fraction of the unit interval. The boost current magnitude is a sub-unity fraction of the source driver current magnitude, and the current generator is coupled in parallel with the source driver.

One embodiment relates to a method of providing a boost current on a digital bus line having a current-mode source driver operative to transmit a signal on the bus line by driving a predetermined current onto the bus line for a unit interval of a predetermined duration. A signal transition on the bus line by the source driver is sensed. In response to the signal transition, boost current is driven on the bus line in the same direction as the source driver, at a magnitude that is a sub-unity fraction of the driver current magnitude, for a duration that is a sub-unity fraction of the unit interval.

DETAILED DESCRIPTION

Embodiments of the present invention apply parallel, rather than series, corrective signal processing to improve performance on bus lines (e.g., as measured by an eye diagram), in order not to impact the basic integrity of the low impedance wired connection from DC to at least the signaling rate (e.g. 480 MHz). Additionally, the parallel connection of the correction circuit has very high output impedance, to avoid reductions to the designed 90Ω differential characteristic impedance over the frequency range of interest. In one embodiment, this is accomplished by applying an additional parallel current source, which theoretically has infinite source impedance, and in practice has very high source impedance. A parallel trans-conductance amplifier (or equivalently, controlled current sources) is thus considered as the means of applying correction. The correction is applied at the source (driving side) of the link, in order to ensure that both the Tx and Rx eye diagrams are compliant.

A bus line is primarily driven by a current-mode source driver. The source driver is operative to transmit a signal on the bus line by driving a predetermined current onto the bus line for a unit interval of a predetermined duration. The unit interval is also known as a symbol period. According to embodiments described herein, a current boost circuit in parallel with the source driver augments the signal that the source driver drives onto the bus line.

In order to prevent any possibility of overwhelming the source driver by the boost current (especially if there is any danger that the boost current could be triggered unintentionally), the boost current magnitude is a sub-unity fraction of the source driver current magnitude (for example, 20%). In some embodiments, a signal used to control the boost current is derived from the bus data line that will be driven, which may cause positive feedback. Injecting only a small fraction of the signaling current ensures a sufficient gain margin to avoid instability.

Additionally, the duration of the boost current is a sub-unity fraction of the unit interval. The boost current begins as soon as a signal transition is detected on the bus line, and must not persist past the end of the intended symbol period. In fact, as described herein, the boost current is most helpful while a signal transition is in progress, when it helps overcome the natural low-pass nature of the channel.

In one embodiment, the current boost circuit comprises a linear Finite Impulse Response (FIR) filter consisting of at least two opposite signed taps to create a differentiator, the result of which is summed with the main signaling current from the source driver. The injection of the boost current should start as soon as possible after a signal transition has been detected on the bus line, and should terminate before the unit interval is completed. This implies the alignment of the earliest tap of the FIR filter as closely as possible with real time, while the other is deliberately delayed by some fraction of a unit interval.

In another embodiment, the boost current is digitally controlled, e.g., by edge triggered monostable circuits triggered on positive or negative signal transitions. In this case, the total latency to create a reliable edge transition detector, trigger the monostable, and then fully switch on the boost current source requires careful design optimization.

Figure 1:
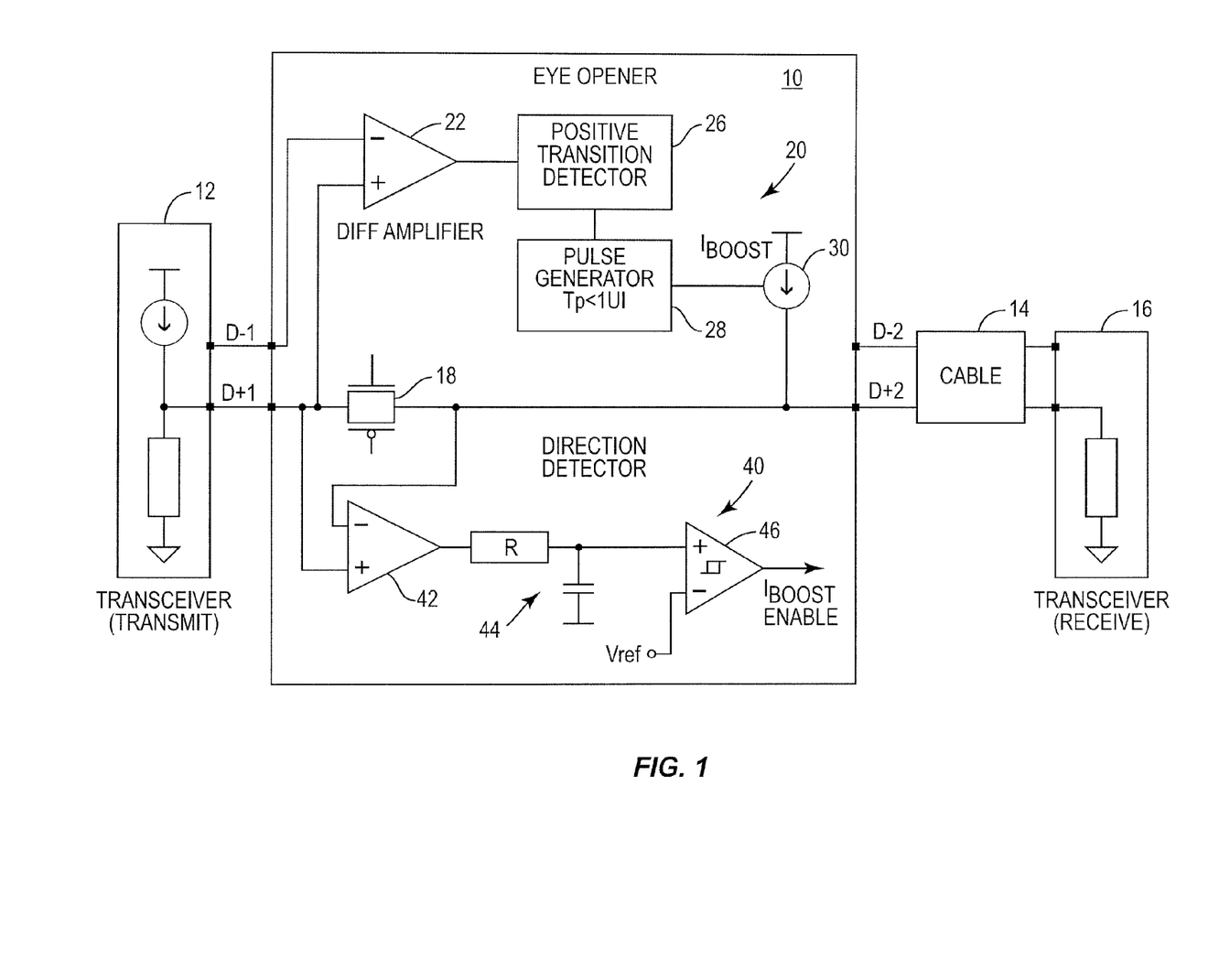
FIG. 1 is a functional block diagram of an inventive eye opener circuit.

FIG. 1 depicts a current boost circuit 10, in the context of driving a differential bus line (e.g., USB 2.0 serial data line). FIG. 1 depicts a current-mode source driver in a transmit transceiver 12, differential data lines D+ and D−, the current boost circuit 10, the data line cable 14, and a receiver in a receive transceiver 16. A CMOS switch 18 isolates the transmit transceiver 12 from the bus line when another driver (e.g., the receive transceiver 16) is driving the bus.

The current boost circuit comprises a current boost circuit 20 (above the bus line D+) and a direction detector 40 (below the bus line D+) operative to inhibit the current boost circuit 20 if a detected signal transition is not driven by the source driver 12. Only one instance of the eye opener circuit 10—boosting a signal on the D+ bus line—is depicted for clarity. In a given implementation, another instance of the eye opener circuit 10 would drive the D− bus line. Additionally, another pair would drive any other differential bus lines requiring performance enhancement, such as control lines.

The current boost circuit 20 comprises a differential amplifier 22, a transition detector 26, a pulse generator 28, and a boost current source 30. The differential amplifier 22 is connected to both the D+ and D− differential bus lines, proximate the source driver 12, such that injection of current onto the D+ line by the source driver 12 generates a positive edge transition at the output of the differential amplifier 22. This transition is detected by the transition detector 26, which triggers a pulse generator 28. The pulse generator 28 may comprise a monostable multivibrator with a predetermined duration that is a sub-unity fraction of the unit interval of the source driver 12. The pulse thus generated by the pulse generator 28 controls the boost current generator to drive a boost current onto the bus line D+. The boost current is in the same direction as, and is a sub-unity fraction of the magnitude as, the signal current driven onto the D+ bus line by the source driver 12. Of course, in the non-pictured companion eye opener 10, a negative transition at the output of the differential amplifier 22 is detected and used to drive boost current onto the D− line, with similar duration and magnitude parameters.

FIG. 1 also depicts a direction detection circuit 40 operative to determine whether the drive current is driven onto the bus line from a driver other than the source driver 12, such as the receive transceiver 16 at the far end of the link. If so, the direction detection circuit 40 is operate to inhibit the driving of boost current onto the bus line. In particular, the inputs to a differential amplifier 42, configured as a sensing amplifier, are connected to opposite sides of a resistive element in series with the bus line, such as the on-resistance of a CMOS switch 18 used to isolate the source driver 12 from the bus line when it is not driving. The output of the sensing amplifier 42 reflects the voltage drop across the switch 18, and hence indicates whether current on the bus line D+ is driven by the source driver 12 or, e.g., the receive transceiver 16. The sensing amplifier 42 output is low-pass filtered, such as by RC circuit 44, and the resulting voltage level is presented at the input to a differential amplifier 46, used as a comparator. The comparator 46 compares the presented voltage with a predetermined reference voltage, and generates a current boost enable signal if it exceeds the reference voltage. Although not depicted for clarity, the boost current enable signal may be combined (e.g., ANDed) with a companion signal from the other differential bus line, and the result combined (e.g., ANDed) with the pulse generator 28 output to drive the boost current generator 30 only when the source driver 12 is driving the bus line D+.

The direction detection circuit 40 is not an essential element of the present invention, and may be omitted where signal integrity is not so degraded that unintended or badly timed triggering of the boost current circuit is a concern. Of course, parameters such as the voltage drop across the switch 18, the gain of the sensing amplifier 42, the filter parameters of the low-pass filter 44, and the value of the reference voltage input to the comparator 46, must all be selected for proper operation in a given implementation—a task well within the skill of those of ordinary skill in the electronic arts.

Figure 11:
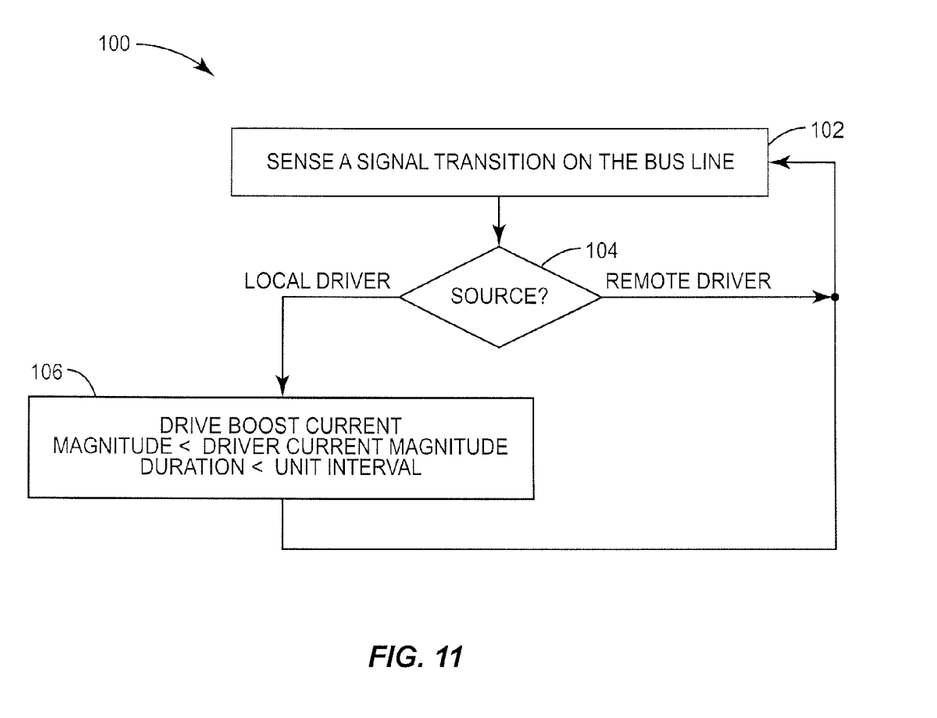
FIG. 11 is a flow diagram of a method of providing a boost current on a digital bus line using the eye-opener circuit of FIG. 1.

FIG. 11 depicts a method of providing a boost current on a digital bus line using the eye opener circuit of FIG. 1, including both the boost current circuit 20 and the direction detection circuit 40. The boost current circuit 20 senses a signal transition on the bus line by the source driver (block 102). If the direction detection circuit 40 detects that the source of the signal transition is a remote driver (block 104), no boost current is generated, and the eye opener circuit 10 again monitors the bus line for signal transitions. If the direction detection circuit 40 detects that the source of the signal transition is the source driver (block 104), it enables the boost current circuit 20 to drive a boost current onto the bus line, in the same direction as the source driver, at a magnitude that is a sub-unity fraction of the driver current magnitude, and for a duration that is a sub-unity fraction of the unit interval (block 106). When the boost current circuit 20 terminates the boost current, it again returns to monitoring the bus line for signal transitions (block 102).

In another embodiment, the functions of edge detection and monostable pulse generation are effectively implemented as a two-tap Finite Impulse Response (FIR) filter with equal and opposite tap weights spaced by the desired pulse duration Tp. The FIR filter may be implemented in the analog domain by subtracting a delayed and non-delayed version of the analog signal (thus creating a fully linear scheme), or may be implemented in the digital domain, possibly using single-bit quantization of the differential signaling voltage output to create a low complexity (non-linear) solution.

In implementations where an explicit monostable pulse generator is used, the triggering latency should be as low as possible, and ideally below 0.25UI (520 ps). Also, the monostable pulse should be terminated before the end of the unit interval to avoid creating inter-symbol interference with the following unit interval.

Figure 2:
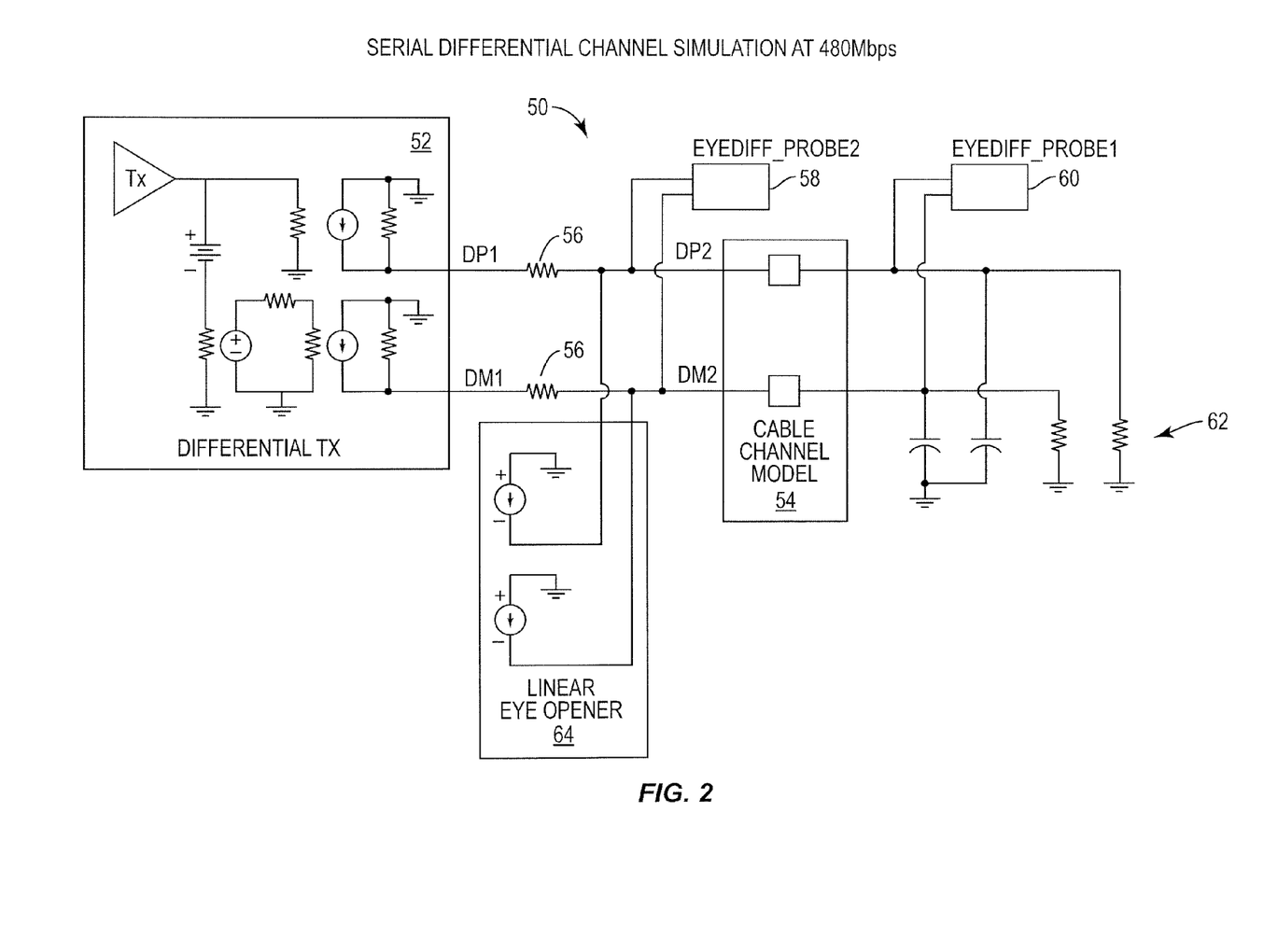
FIG. 2 is a schematic of a simulation environment for testing the circuit of FIG. 1.

FIG. 2 depicts a schematic of a simulation environment 50 used to simulate embodiments of the present invention. The simulation environment 50 comprises a differential transmitter 52, series resistors 56, a bus line channel model 54, eye diagram testing probes 58, 60 at the near end and far end of the channel model 54, respectively, load resistances 62, and an eye opener model 64. The differential transmitter 52 models a current-mode source driver 12, and the series resistors 56 are modeled as 10Ω each, representing a bad case of unwanted source resistance (e.g., due to CMOS switches 18 being used for routing purposes).

The eye opener circuit 64 consists of a pair of Voltage Controlled Current Sources that implement a Z-domain transfer function consisting of two active taps [0.5, 0.0, 0.0, 0.0, 0.0, −0.5] with a separation chosen in this case to be half the unit interval, or 0.5 UI. (The timestep is 0.1 UI). The transconductance value was selected to give a boost current equal to 25% of the normal source drive current of 17.78 mA. Both the duration and magnitude of the boost current can be used as design parameters to tune performance when trading off eye diagram improvement vs. overshoot, as depicted in FIGS. 4-9. For USB 2.0 eye compliance, as a representative application, the voltage at the near end of the link (i.e., at the connector of the device) may not exceed 525 mV, in UI following a transition, whereas the nominal case is 402.3 mV. This implies a maximum allowable boost of 30.5% in voltage magnitude at that node, and thus a corresponding current boost of 30.5% of the source drive current. However if there is a known loss, e.g. due to the 'on' resistance of the CMOS switches 56, (assumed as 10Ω in the simulation environment 50), this would reduce the nominal level to 360 mV, giving scope for larger boost injection before the maximum voltage swing would be exceeded. However, the magnitude of the boost current must be reduced according to a full tolerance analysis of the system, making it advantageous for that current to be calibrated or defined by an external resistor.

The means of building the fractional UI delay needed for the two-tap FIR filter depends on whether analog delay is needed, as in the case of a fully linear system, or digital delay is needed, as in the case of single-bit quantization of signaling voltage. For analog delay, all pass filter structures may be considered, whereas for digital delay, cascaded inverter chains may be used, or if a suitable clock is available (preferably phase locked to the data stream), synchronous circuits, such as D-type flip-flops may be used.

Figure 3:
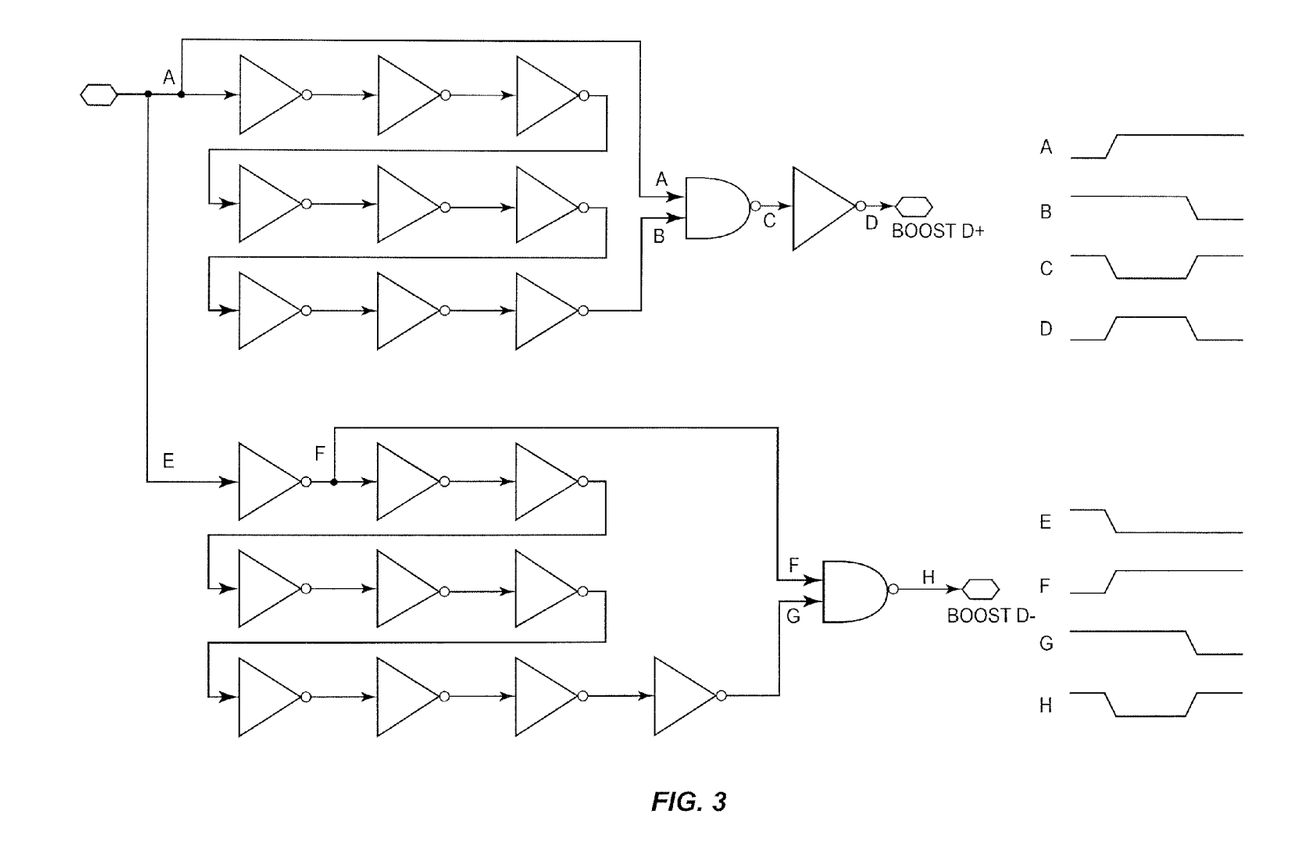
FIG. 3 is a schematic of a delay circuit comprising chained inverters.

FIG. 3 depicts a chain of CMOS inverter gates used, in one embodiment, to obtain the digital delay, implementing the functionality of both the transition detector 26 and the pulse generator 28 of FIG. 1. In FIG. 3, each inverter gate consists of a complimentary PMOS and NMOS transistor pair, suitably dimensioned to create the desired delay when replicated in a long chain. The input to the inverter chains is the output of the differential amplifier 22. As depicted in the accompanying timing diagrams, a positive edge at the input port (A) will cause a brief pulse on the boostD+output (D). A negative edge at the input port (E) will cause a brief pulse on the boostD− output (H). The boostD+ and boostD− output signals may be used as the boost current enable signal, output in FIG. 1 by the pulse generator 28.

Simulations were conducted to obtain eye-density diagrams at the Tx and Rx ends of the cable channel, both without the eye opener circuit 64 applied and with various durations of boost current supplied by the eye opener circuit 64. As described above with respect to FIG. 2, the simulation environment 50 employs a synthetic channel model 54, having a series source resistance 56 of 10Ω. This effectively models a relatively poor example of a USB cable, as a representative application example. A linear version of the equalizer was used to obtain these results. FIGS. 4-9 depict the results, with the Tx eye probe graph to the left and the Rx eye probe graph to the right. As those of skill in the art will readily recognize, ideally no signal trace on the Rx eye density graph should violate the center region, demarked by a hexagon, and distance of the signal traces from this region represent signal margin to the bus specification.

Figure 4:
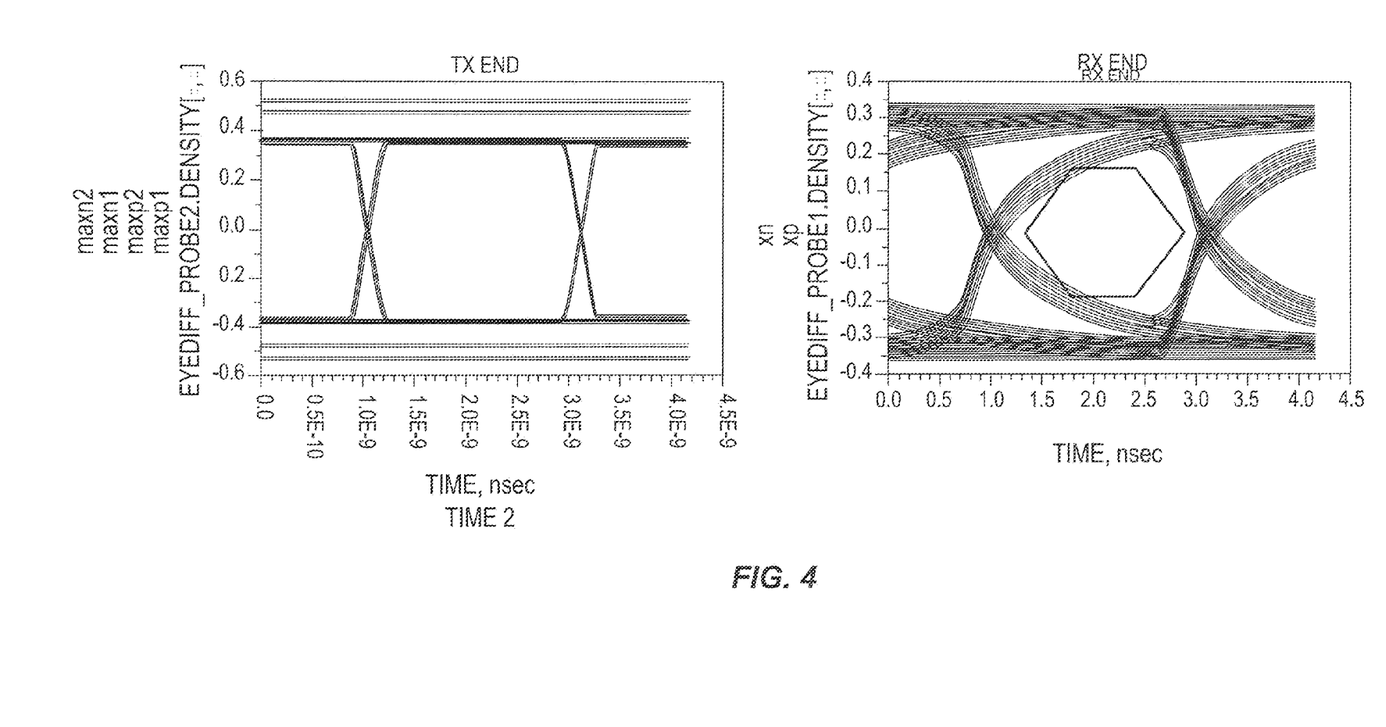
FIG. 4 is a transmit eye diagram in the simulation environment of FIG. 2 without compensation.

FIG. 4 depicts the simulated eye diagram without the eye opener 64 compensation active.

Figure 5:
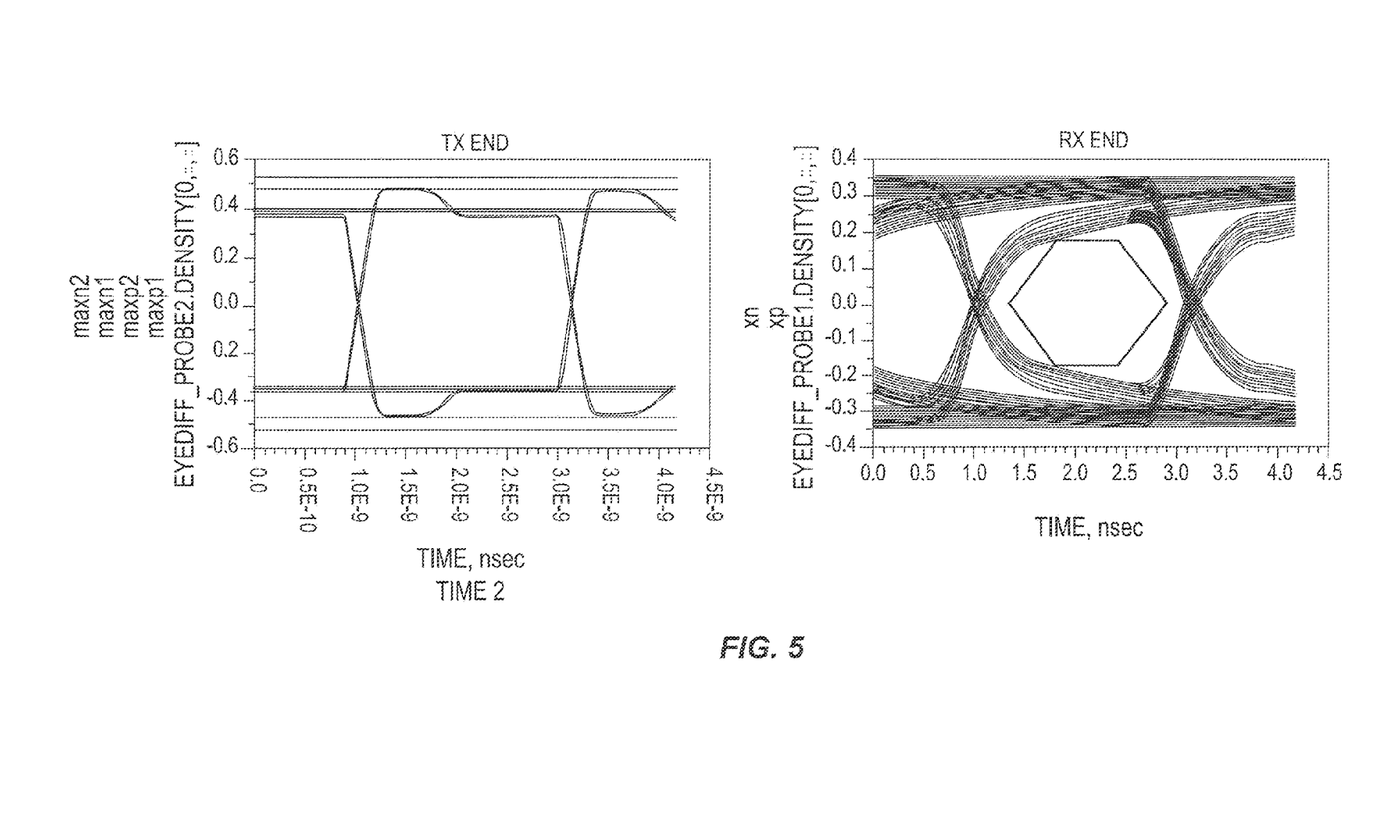
FIGS. 5-9 are transmit eye diagrams in the simulation environment of FIG. 2 with the circuit of FIG. 1 enabled, with various parameters.

FIG. 5 depicts the simulated eye diagram with the eye opener 64 compensation active, with $T_{PULSE}$=0.4UI and $I_{BOOST}$=25% of the source drive current magnitude. Note that the transmitted signals have a greater differential magnitude for approximately 40% of the unit interval. The Rx eye diagram depicts improvement from the uncompensated case, although some traces have no margin.

Figure 6:
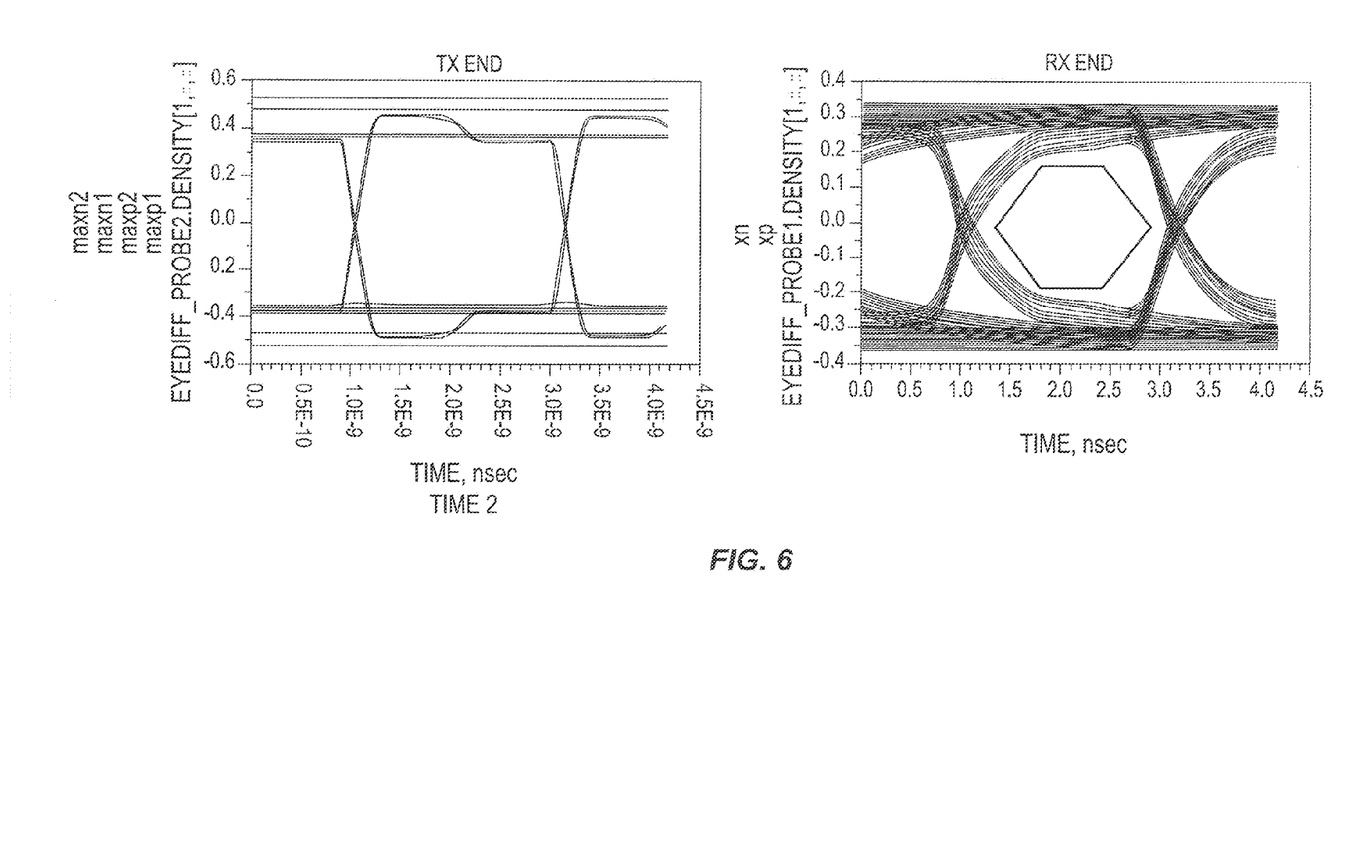

FIG. 6 depicts the simulated transmit eye diagram with the compensation in effect, with $T_{PULSE}$=0.5UI and $I_{BOOST}$=25% of the source drive current magnitude.

Figure 7:
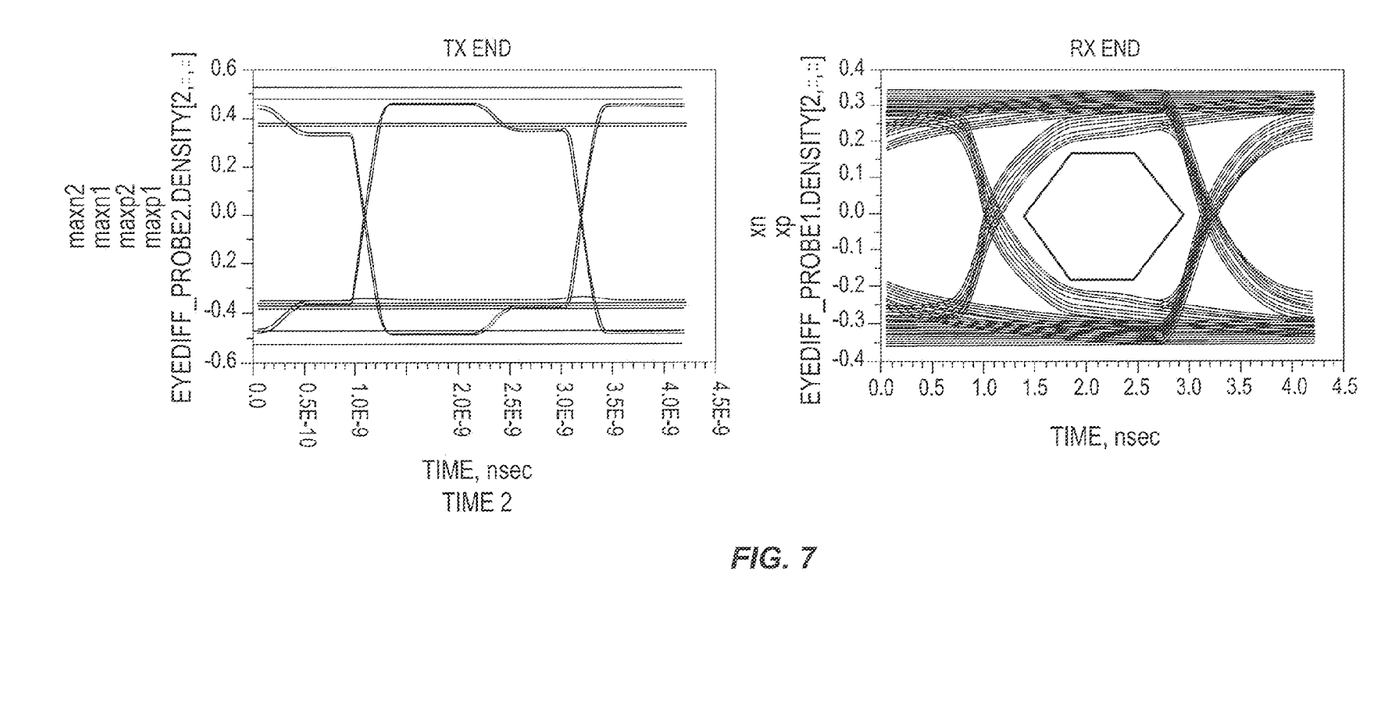

FIG. 7 depicts the simulated transmit eye diagram with the compensation in effect, with $T_{PULSE}$=0.6UI and $I_{BOOST}$=25% of the source drive current magnitude.

Figure 8:
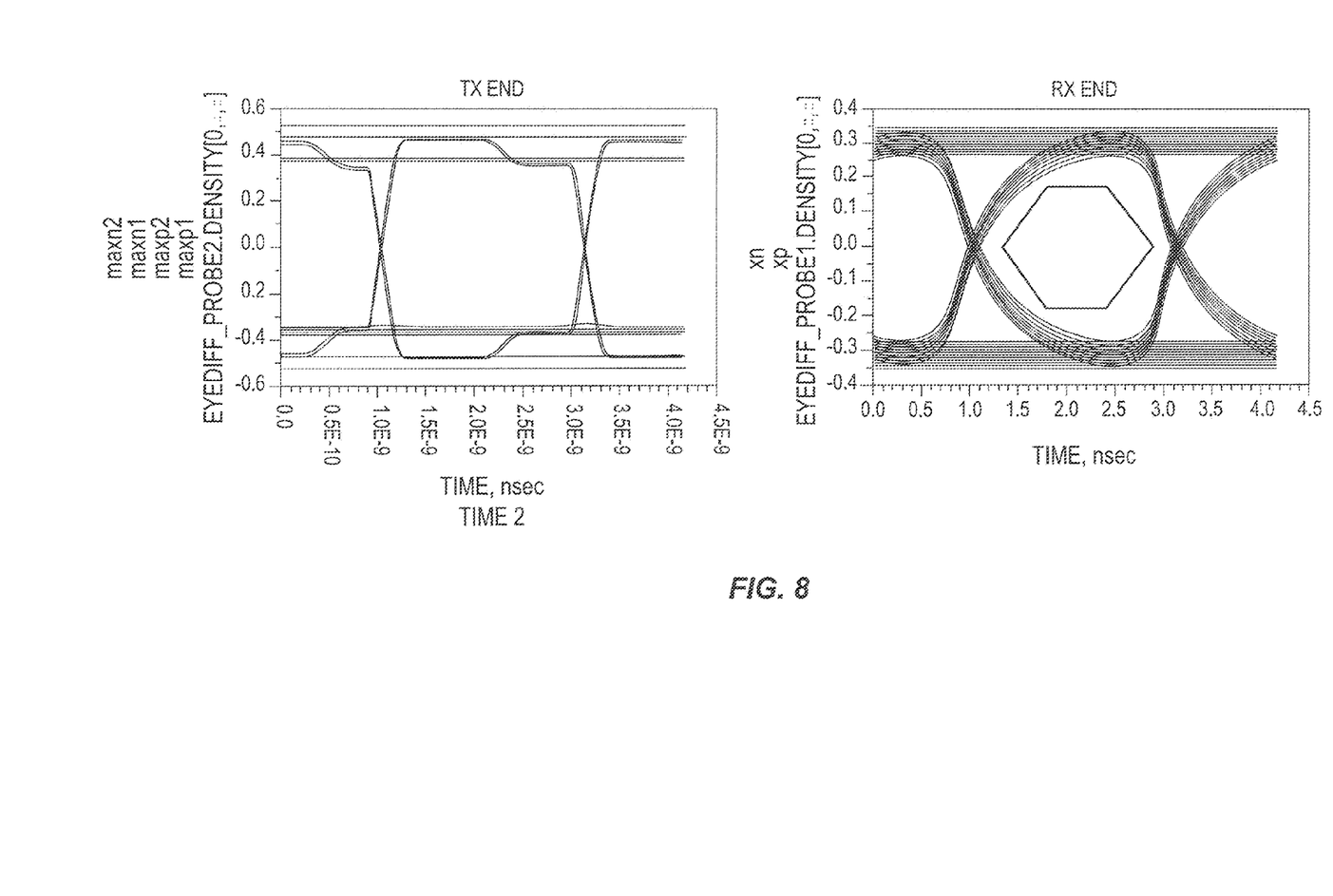

FIG. 8 depicts the simulated transmit eye diagram with the compensation in effect, with $T_{PULSE}$=0.7UI and $I_{BOOST}$=25% of the source drive current magnitude.

Figure 9:
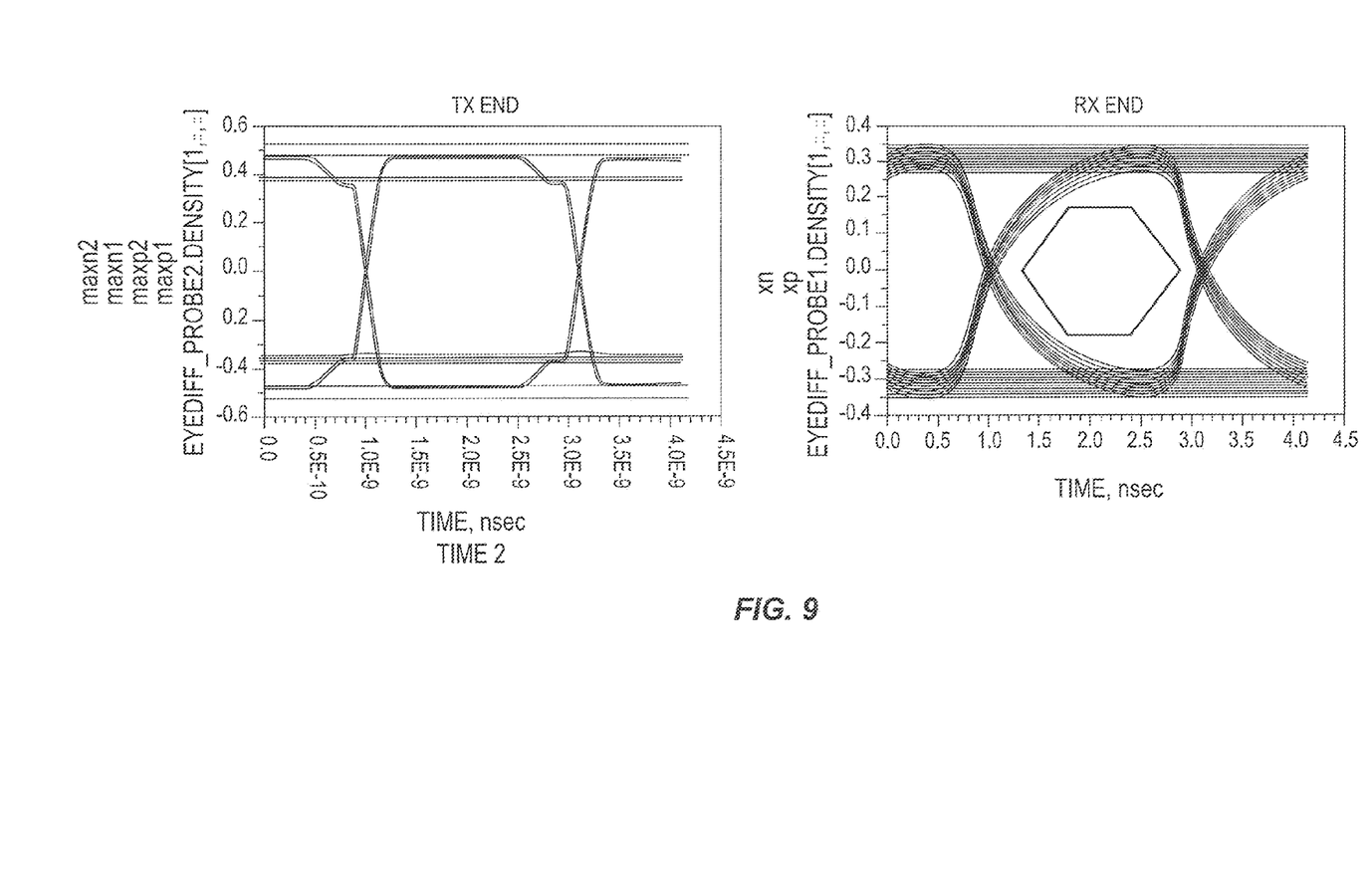

FIG. 9 depicts the simulated transmit eye diagram with the compensation in effect, with $T_{PULSE}$=0.8UI and $I_{BOOST}$=25% of the source drive current magnitude.

In each of FIGS. 6-9, the increased duration of drive current can be seen as greater differential magnitude for a larger fraction of the unit interval in the Tx eye diagram, and correspondingly greater margins in the Rx eye diagram.

Increasing the boost current further would clearly be advantageous to the performance with this very severe simulated channel; however, the maximum voltage swing limitation of the USB 2.0 specification (as a representative application) does not allow much scope for this. Any significant increase above the boost levels used for the above simulations would require the boost current magnitude to be accurately controlled to ensure that a fraction of the production parts will not violate the outer eye-diagram mask at the transmitter.

If the target specification for the boost current is set to 25% nominal with 30% as the outer limit, then a 20% 3-sigma spread of the boost current magnitude can be targeted for the case of a USB 2.0 design. It has further been shown that the duration of the pulse is not critical as long as it is not allowed to fall below 0.4UI, and can be guaranteed not to exceed 1 UI. A range between 0.4 and 0.9UI could therefore be targeted for the design.

Figure 10:
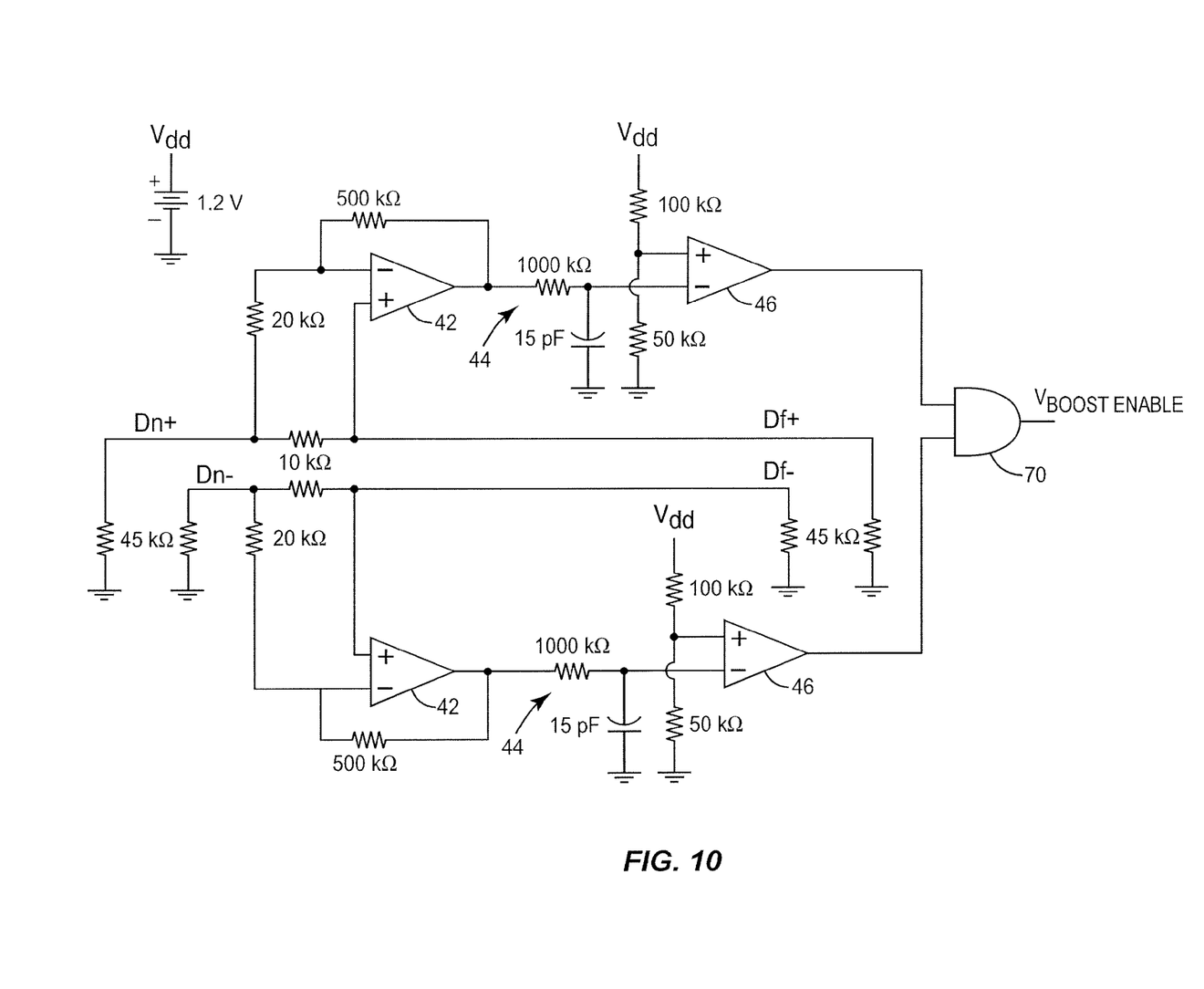
FIG. 10 is a schematic of a circuit to disable the circuit of FIG. 1 when the source of drive is detected at the far-end of a bus link.

FIG. 10 depicts one embodiment of the direction detection circuit 40 depicted in FIG. 1, as applied to both differential bus lines D+ and D−, with component parameters selected for proper operation in the specific application of USB 2.0 serial bus. The differential amplifier 42 senses the direction of current flow in each of the differential bus lines, by comparing, e.g., the voltages of the near side (Dn) and far side (Df) of the bus line across a series resistance 18, which may, for example, comprise the on-resistance of a MOSFET isolation switch.

These sensing amplifiers 42 are arranged to have a limited gain (as compared to the very high open loop gain case) to prevent input offset voltages being multiplied by a large open-loop gain value, when a line is not sourcing or sinking current. Thus, when no current is flowing in either of the bus lines, any small residual voltages will be multiplied by the limited gain of the amplifiers 42, but will not be sufficient to exceed the reference voltage (derived from a series resistance voltage divider) of the following comparator stage 46, and thus both inputs to the AND gate 70 will be high, causing the boost current generator 30 (FIG. 1) to be enabled.

When signaling is being sent from the near end by sourcing current into Dn+ or Dn−, neither of the sensing amplifiers 42 will switch on, since the signaling current raises the inverting input of the amplifier 42 higher than the non-inverting amplifier 42 input. Thus both inputs to the AND gate 70 will be held high, and the boost current generator 30 will be continue to be enabled.

However, when a current of the appropriate signaling magnitude is sourced from the far end of the link, e.g., Df− or Df+, one or other of the current sensing amplifiers 42 will turn on, and after a number of unit intervals, random data will sufficiently charge the integration capacitor to turn the following comparator 46 off. No matter which of the comparators 46 gets turned off first, the AND gate 70 will fall to a logical low, and the current boost generator 30 will be disabled.

Numerous variations on the disclosed embodiments will be readily apparent to those of skill in the art, given the teachings of the present disclosure. For example, the present invention may be applied to single-ended, rather than differential, bus lines. As another example, non-linear functions of the signaling voltage may be used to increase the boost current in the transition phase, relative to the steady-state phase, of the signaling waveform of a signal on the bus line. As yet another example, in some embodiments boost current may be applied only during the transition phase of a bus line signal, between logic levels (in such cases, the boost current duration will be inversely proportional to the slew rate achieved by the main bus line driving circuits). The latter may be implemented, for example, by use of a transition detector 22, 26 without a following monostable pulse generator 28. These embodiments all fall within the broad scope of the present invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A current boost circuit to augment a signal on a digital bus line that is primarily driven by a current-mode source driver operative to transmit a signal on the bus line by driving a predetermined current onto the bus line for a unit interval of a predetermined duration, comprising:
    a trigger circuit operative to detect a signal transition on the bus line driven by the source driver; and
    a current generator operative to drive boost current on the bus line in the same direction as the source driver, for a duration that is a sub-unity fraction of the unit interval, the boost current magnitude being a sub-unity fraction of the source driver current magnitude;
    the current generator operative independently of, and being coupled in parallel with, the source driver.

2. The current boost circuit of claim 1 wherein the digital bus line is single-ended.

3. The current boost circuit of claim 1 wherein the digital bus line is differential, and comprising a current boost circuit for each differential signal of the digital bus line.

4. The current boost circuit of claim 1 wherein the trigger circuit comprises:
    an edge detector operative to detect a signal transition on the bus line; and
    a pulse generator operative to generate, in response to detecting a signal transition by the edge detector, a pulse having a duration a sub-unity fraction of the unit interval; and
    wherein the current generator is operative to drive boost current on the bus line during the pulse.

5. The current boost circuit of claim 4 wherein the edge detector detects a signal transition based on an output from a differential amplifier.

6. The current boost circuit of claim 4 wherein the pulse generator generates a pulse from a monostable vibrator triggered by the edge detector.

7. The current boost circuit of claim 4 wherein the edge detector and pulse generator are embodied by a two-tap Finite Impulse Response (FIR) filter with equal and opposite tap weights spaced by the boost current duration and wherein the output of the FIR filter is summed with the driver current.

8. The current boost circuit of claim 1 wherein the boost current magnitude is less than or equal to 30.5% of the driver current magnitude.

9. The current boost circuit of claim 1 wherein the boost current duration is greater than or equal to 40% of the unit interval.

10. The current boost circuit of claim 9 wherein the boost current duration is less than or equal to 80% of the unit interval.

11. The current boost circuit of claim 1 wherein the transmitted signal comprises a transition phase and a steady-state phase, and further comprising:
a non-linear current generator controller operative to control the current generator so as to generate greater boost current in the transition phase of the bus signal, relative to the boost current generated in the steady-state phase of the bus signal.

12. The current boost circuit of claim 1 wherein the digital bus line is bidirectional, and further comprising:
a direction detection circuit operative to detect whether the signal transition is driven by the source driver or an alternative driver, and further operative to inhibit the current generator from generating boost current if the signal transition is driven by an alternative driver.

13. The current boost circuit of claim 12 wherein the direction detection circuit comprises a differential amplifier having positive and negative inputs connected to opposite sides of a resistive element in series with the source driver on the bus line.

14. The current boost circuit of claim 13 wherein the resistive element is a switch.

15. A method of providing a boost current on a digital bus line having a current-mode source driver operative to transmit a signal on the bus line by driving a predetermined current onto the bus line for a unit interval of a predetermined duration, comprising the steps of:
detecting a signal transition on the bus line driven by the source driver; and
in response to detecting the signal transition, driving boost current on the bus line in the same direction as the source driver, at a magnitude that is a sub-unity fraction of the driver current magnitude, for a duration that is a sub-unity fraction of the unit interval.

16. The method of claim 15 wherein the boost current magnitude is less than or equal to 25% of the driver current magnitude.

17. The method of claim 15 wherein the transmitted signal comprises a transition phase and a steady-state phase, and further comprising the step of:
driving greater boost current onto the bus line in the transition phase of the transmitted signal, relative to a boost current driven in the steady-state phase of the transmitted signal.

18. The method of claim 15 further comprising the steps of:
detecting whether the signal transition is driven by the source driver or an alternative driver; and
inhibiting the boost current if the signal transition is driven by an alternate driver.

* * * * *